US012580124B2

(12) United States Patent
Jin et al.

(10) Patent No.: US 12,580,124 B2
(45) Date of Patent: Mar. 17, 2026

(54) GRAIN BOUNDARY DIFFUSION METHOD FOR BULK RARE EARTH PERMANENT MAGNETIC MATERIAL

(71) Applicants: ZHEJIANG UNIVERSITY, Hangzhou (CN); ZHEJIANG INNUOVO MAGNETICS CO., LTD., Dongyang (CN)

(72) Inventors: Jiaying Jin, Hangzhou (CN); Mi Yan, Hangzhou (CN); Zhonghua Wei, Dongyang (CN); Dongliang Zhao, Dongyang (CN); Yongming Tao, Hangzhou (CN)

(73) Assignees: ZHEJIANG UNIVERSITY, Hangzhou (CN); ZHEJIANG INNUOVO MAGNETICS CO., LTD., Dongyang (CN)

( * ) Notice: Subject to any disclaimer, the term of this patent is extended or adjusted under 35 U.S.C. 154(b) by 689 days.

(21) Appl. No.: 17/842,923

(22) Filed: Jun. 17, 2022

(65) Prior Publication Data

US 2022/0319773 A1 Oct. 6, 2022

Related U.S. Application Data

(63) Continuation-in-part of application No. PCT/CN2020/141348, filed on Dec. 30, 2020.

(30) Foreign Application Priority Data

Dec. 31, 2019 (CN) ......................... 201911423881.7

(51) Int. Cl.
*H01F 41/02* (2006.01)
*B22F 3/105* (2006.01)
*H01F 1/057* (2006.01)

(52) U.S. Cl.
CPC .......... *H01F 41/0293* (2013.01); *B22F 3/105* (2013.01); *H01F 1/0577* (2013.01); *B22F 2003/1051* (2013.01)

(58) Field of Classification Search
CPC .... H01F 1/0577; H01F 41/0293; B22F 3/105; B22F 2003/1051
See application file for complete search history.

(56) References Cited

U.S. PATENT DOCUMENTS

| | | | | |
|---|---|---|---|---|
| 2016/0141083 | A1* | 5/2016 | Ito | H01F 1/0572 252/62.55 |
| 2018/0182519 | A1* | 6/2018 | Ito | H01F 41/0293 |
| 2019/0385790 | A1* | 12/2019 | Kong | H01F 41/0293 |
| 2020/0303120 | A1* | 9/2020 | Zhou | C23C 10/30 |

FOREIGN PATENT DOCUMENTS

| | | | | | |
|---|---|---|---|---|---|
| CN | 101006534 | A | | 7/2007 | |
| CN | 103474225 | A | * | 12/2013 | |
| CN | 104575902 | A | * | 4/2015 | |
| CN | 105931783 | A | * | 9/2016 | H01F 1/0577 |
| CN | 106910613 | A | | 6/2017 | |
| CN | 106952721 | A | * | 7/2017 | H01F 41/0266 |
| CN | 107146671 | A | * | 7/2017 | |
| CN | 107275028 | A | | 10/2017 | |
| CN | 108183021 | A | | 6/2018 | |
| CN | 108766703 | A | | 11/2018 | |
| CN | 108962580 | A | | 12/2018 | |
| CN | 110534331 | A | * | 12/2019 | |
| CN | 110931197 | A | * | 3/2020 | B22F 1/0059 |
| CN | 111063536 | A | | 4/2020 | |
| CN | 111091944 | A | | 5/2020 | |
| EP | 2869311 | A1 | | 5/2015 | |
| JP | S62192566 | A | | 8/1987 | |
| JP | 2017188515 | A | | 10/2017 | |
| WO | WO-2019114487 | A1 | * | 6/2019 | H01F 1/0577 |
| WO | WO-2021136366 | A1 | * | 7/2021 | H01F 41/0293 |

OTHER PUBLICATIONS

Chu et al. Structural and Magnetic Study of Hot-Pressed and Hot-Deformed Nd13.5-xCexFe80.4B5.6 (x = 0, 0.5, 1) Prepared by Spark Plasma Sintering. IEEE Transactions on Magnetics, vol. 48, No. 6, Jun. 2012. 2092-2095. (Year: 2012).*

Fugang Chen et al. Coercivity enhancement of a Ce-based permanent magnet by grain boundary diffusion with Re70Cu30 (Re: Nd/Dy) eutectic alloys. Journal of Alloys and Compounds 819 (2020) 152965. (Year: 2020).*

Zhou et al. Coercivity Enhancement of Nd-Ce-Fe-B Sintered Magnets by the Grain Boundary Diffusion Process Using Nd-Al-Cu Alloy. IEEE Transactions on Magnetics, vol. 54, No. 11, Nov. 2018. 210804. (Year: 2018).*

Bin Chen et al. Coercivity enhancement of hot-deformed (Ce,Nd,Pr)-Fe-B magnets by grain boundary diffusion of Pr-Cu alloy. Journal of Magnetism and Magnetic Materials 497 (2020) 166002. (Year: 2020).*

* cited by examiner

*Primary Examiner* — Keith Walker
*Assistant Examiner* — Stephani Hill
(74) *Attorney, Agent, or Firm* — Bayramoglu Law Offices LLC

(57) ABSTRACT

A grain boundary diffusion method for a bulk rare earth permanent magnetic material includes the following steps: (1) fabricating an initial magnet by a sintering, hot pressing, or hot deformation process; (2) loading a grain boundary diffusion alloy source on a surface of the magnet through electrodeposition, chemical vapor deposition (CVD), physical vapor deposition (PVD), direct physical contact, or adhesive bonding; and (3) placing the initial magnet loaded with the grain boundary diffusion alloy source in a SPS device, and heating to obtain a final magnet. The current, plasma, and pressure in an SPS process can be controlled to significantly improve elemental diffusion coefficient and enhance the diffusion depth. The bulk rare earth permanent magnetic material undergoing grain boundary diffusion fabricated in the present disclosure has a significant increase in magnetic properties that catering to commercial demands for industrial production.

4 Claims, No Drawings

GRAIN BOUNDARY DIFFUSION METHOD FOR BULK RARE EARTH PERMANENT MAGNETIC MATERIAL

CROSS REFERENCE TO THE RELATED APPLICATIONS

This application is a continuation-in-part application of International Application No. PCT/CN2020/141348, filed on Dec. 30, 2020, which is based upon and claims priority to Chinese Patent Application No. 201911423881.7, filed on Dec. 31, 2019, the entire contents of which are incorporated herein by reference.

TECHNICAL FIELD

The present disclosure relates to the field of permanent magnets, and in particular to a grain boundary diffusion method for a bulk rare earth permanent magnetic material.

BACKGROUND

Neodymium iron boron (NdFeB) has excellent comprehensive magnetic properties and is widely used in fields such as energy, information, transportation, and national defense. NdFeB is one of the most important rare earth functional materials and one of the key basic materials for the national economy. However, sintered NdFeB shows poor temperature stability and has a working temperature usually lower than 100° C., which greatly limits its applications in electric vehicles, wind power, and aerospace. At present, the use of cheap and high-abundance rare earths La/Ce/Y to replace the expensive Nd/Pr/Dy/Tb greatly reduces the raw material cost of rare earth permanent magnets, which has gained widespread attention inside and outside China. However, the intrinsic magnetism of a 2:14:1 phase formed by lanthanum, cerium, and yttrium is weaker than that of $Nd_2Fe_{14}B$, and the magnetic dilution of a high-abundance rare earth permanent magnet is significant. Specifically, the coercivity is low, which cannot meet the commercial requirements. This problem is difficult to solve, which has restricted the development and application of high-abundance rare earth permanent magnets for a long time.

At present, methods for improving the coercivity of NdFeB mainly include: 1) Addition of heavy rare earths through smelting. However, the introduction of a large amount of uniformly-distributed Dy/Tb into a main phase not only greatly increases the raw material cost due to the consumption of scarce heavy rare earth resources, but also greatly reduces the remanence and magnetic energy product. 2) Grain refinement. However, the magnetic powders are easily oxidized after a grain size to 3 μm or smaller, which decrease the coercivity unfortunately. 3) Grain boundary diffusion. This method can greatly improve the coercivity of NdFeB magnets, involves simple operations, and can realize the efficient utilization of rare earths. Therefore, grain boundary diffusion is currently a research hotspot. However, due to the limited element diffusion depth, the conventional grain boundary diffusion method is merely suitable for magnets with a thickness of less than 5 mm, and thus the large-scale application is limited. How to improve a grain boundary diffusion depth and develop a grain boundary diffusion method for a bulk rare earth permanent magnetic material is currently a research challenge in the field of rare earth permanent magnets.

SUMMARY

In order to overcome the deficiencies of the prior art, the present disclosure provides a grain boundary diffusion method for a bulk rare earth permanent magnetic material, including the following steps:

(1) fabricating an initial magnet by a sintering, hot pressing, or hot deformation process;

(2) loading a grain boundary diffusion alloy source on a surface of the initial magnet; (3) placing the initial magnet loaded with the alloy source in a spark plasma sintering (SPS) device, and heating the initial magnet loaded with the alloy source at a heating rate of 20° C./min to 400° C./min in the SPS device to allow grain boundary diffusion for 20 min to 180 min at a diffusion temperature of 400° C. to 900° C., a pressure of 2 MPa to 50 MPa, and a vacuum degree of less than $10^{-3}$ Pa to obtain a final magnet.

The final magnet fabricated in step (3) may have a composition of $(R_xA_{1-x})_yQ_{bal}M_zB_w$, where R is one or more selected from the group consisting of high-abundance rare earth elements La, Ce, and Y; A is one or more selected from the group consisting of lanthanide rare earth elements other than La, Ce, and Y; Q is one or more selected from the group consisting of Fe, Co, and Ni; M is one or more selected from the group consisting of Al, Cr, Cu, Zn, Ga, Ge, Mn, Mo, Nb, P, Pb, Si, Ta, Ti, V, Zr, O, F, N, C, S, and H; B is boron; and x, y, z, and w satisfy the following relationships: $0 \le x \le 0.8$, $26 \le y \le 36$, $1 \le z \le 10$, and $0.8 \le w \le 1.3$.

The initial magnet fabricated in step (1) may have a composition of $(R'_aA'_{1-a})_bQ'_{bal}M'_cB_d$, where R' is one or more selected from the group consisting of high-abundance rare earth elements La, Ce, and Y; A' is one or more selected from the group consisting of lanthanide rare earth elements other than La, Ce, and Y; Q' is one or more selected from the group consisting of Fe, Co, and Ni; M' is one or more selected from the group consisting of Al, Cr, Cu, Zn, Ga, Ge, Mn, Mo, Nb, P, Pb, Si, Ta, Ti, V, Zr, O, F, N, C, S, and H; B is boron; and a, b, c, and d satisfy the following relationships: $0 \le a \le 0.8$, $23 \le b \le 33$, $0.5 \le c \le 8$, and $0.9 \le d \le 1.4$.

The grain boundary diffusion alloy source in step (2) may have a composition of $R''_uM''_{1-u}$, where R" is one or more selected from the group consisting of lanthanide rare earth elements; M" is one or more selected from the group consisting of Fe, Co, Ni, Al, Cr, Cu, Zn, Ga, Ge, Mn, Mo, Si, Ti, O, F, and H; and u satisfies the following relationship: $0 \le u \le 1$.

In step 2, a method for loading the grain boundary diffusion alloy source may include: electrodeposition, chemical vapor deposition (CVD), physical vapor deposition (PVD), direct physical contact, or adhesive bonding.

Compared with the prior art, the present disclosure has the following beneficial effects:

1) The present disclosure conducts grain boundary diffusion based on SPS. During a heating process, due to the influence of current, plasma, and pressure, an elemental diffusion coefficient can be increased, and a high-speed channel for diffusion appears in the magnet, which accelerates the infiltration of rare earth and alloy elements into the magnet (at a grain boundary or inside a grain), thereby enhancing a diffusion depth of elements and significantly improving the magnetic properties. It also fully utilizes the characteristic interdiffusion behaviors of abundant rare earth elements La, Ce, Y that are different from other rare earth elements to enhance the magnetic properties. Thus, a grain boundary diffusion method for a bulk rare earth permanent magnetic material is obtained, with a substitution amount of La, Ce, and Y as high as 80%.

2) The present disclosure utilizes the characteristics of SPS such as high heating rate and short heating time to suppress the grain growth during a diffusion process and thus improve the coercivity of a magnet.

DETAILED DESCRIPTION OF THE EMBODIMENTS

The present disclosure will be further described below in conjunction with specific examples, but the present disclosure is not limited to the following examples.

Example 1

An initial magnet $(Pr_{0.12}Nd_{0.48}Ce_{0.4})_{30.8}Fe_{bal}Cu_{0.3}Al_{0.2}Ga_{0.2}Zr_{0.3}B_{1.05}$ with a height of 25 mm was fabricated by a sintering process; a grain boundary diffusion alloy powder $Nd_{80}Al_{20}$ was loaded on a surface of the initial magnet through direct contact; and the initial magnet was placed in a SPS device and then heated at a heating rate of 400° C./min to allow grain boundary diffusion for 40 min at a diffusion temperature of 700° C. and a pressure of 20 MPa to obtain a final magnet with the following magnetic properties: $B_r$=12.4 kG, $h_{cj}$=15.5 kOe, and $(BH)_{max}$=36.6 MGOe.

Example 2

An initial magnet $(Nd_{0.4}La_{0.2}Ce_{0.4})_{32}Fe_{bal}Nb_{0.3}Ti_{0.2}Ga_{0.5}Co_{0.3}B_{0.9}$ with a height of 20 mm was fabricated by a sintering process; a grain boundary diffusion alloy powder $NdH_3$ was loaded on a surface of the initial magnet through polyvinylpyrrolidone (PVP) adhesive bonding; and the initial magnet was placed in an SPS device and then heated at a heating rate of 20° C./min to allow grain boundary diffusion for 100 min at a diffusion temperature of 900° C. and a pressure of 50 MPa to obtain a final magnet with the following magnetic properties: $B_r$=12.2 kG, $h_{cj}$=12.5 kOe, and $(BH)_{max}$=33.4 MGOe.

Example 3

An initial magnet $(Nd_{0.5}Y_{0.1}Ce_{0.4})_{30}Fe_{bal}Zr_{0.15}Cu_{0.3}Co_{0.5}Al_{0.2}B_{1.01}$ with a height of 10 mm was fabricated by a hot deformation process; a grain boundary diffusion alloy powder $Nd_{70}Cu_{30}$ was loaded on a surface of the initial magnet through PVP adhesive bonding; and the initial magnet was placed in an SPS device and then heated at a heating rate of 400° C./min to allow grain boundary diffusion for 60 min at a diffusion temperature of 600° C. and a pressure of 2 MPa to obtain a final magnet with the following magnetic properties: $B_r$=11.3 kG, $H_{cj}$=16.5 kOe, and $(BH)_{max}$=28.2 MGOe.

Example 4

An initial magnet $(Pr_{0.18}Nd_{0.72}Ce_{0.1})_{36}Fe_{bal}Mo_{0.15}Al_{0.15}Cu_{0.2}Zr_{0.2}B_{0.95}$ with a height of 18 mm was fabricated by a sintering process; a grain boundary diffusion alloy source $Dy_{20}Pr_{60}Al_{20}$ was loaded on a surface of the initial magnet through magnetron sputtering; and the initial magnet was placed in an SPS device and then heated at a heating rate of 400° C./min to allow grain boundary diffusion for 180 min at a diffusion temperature of 800° C. and a pressure of 25 MPa to obtain a final magnet with the following magnetic properties: $B_r$=12.5 kG, $H_{cj}$=25.4 kOe, and $(BH)_{max}$=39.2 MGOe.

Example 5

An initial magnet $(Nd_{0.2}Ce_{0.8})_{26}Fe_{bal}Zr_{0.1}Cu_{0.2}Co_{0.5}Al_{0.3}Si_{0.1}B_{1.0}$ with a height of 8 mm was fabricated by a hot deformation process; a grain boundary diffusion alloy powder $Pr_{70}Cu_{30}$ was loaded on a surface of the initial magnet through magnetron sputtering; and the initial magnet was placed in an SPS device and then heated at a heating rate of 100° C./min to allow grain boundary diffusion for 20 min at a diffusion temperature of 650° C. and a pressure of 5 MPa to obtain a final magnet with the following magnetic properties: $B_r$=10.1 kG, $H_{cj}$=11.2 kOe, and $(BH)_{max}$=20.3 MGOe.

Example 6

An initial magnet $(Pr_{0.14}Nd_{0.56}La_{0.1}Ce_{0.2})_{36}Fe_{bal}Ga_{0.35}Al_{0.25}Cu_{0.2}Zr_{0.15}B_{0.93}$ with a height of 60 mm was fabricated by a sintering process; a grain boundary diffusion alloy source $Pr_{80}Al_{20}$ was loaded on a surface of the initial magnet through magnetron sputtering; and the initial magnet was placed in an SPS device and then heated at a heating rate of 400° C./min to allow grain boundary diffusion for 180 min at a diffusion temperature of 700° C. and a pressure of 25 MPa to obtain a final magnet with the following magnetic properties: $B_r$=12.6 kG, $H_{cj}$=18.2 kOe, and $(BH)_{max}$=38.2 MGOe.

What is claimed is:

1. A grain boundary diffusion method for a bulk rare earth permanent magnetic material, comprising the following steps:

(1) fabricating an initial magnet by a sintering, hot pressing, or hot deformation process, wherein the initial magnet has a composition of $(R'_aA'_{1-a})_bQ'_{bal}M'_cB_d$, wherein R' is one or more selected from the group consisting of high-abundance rare earth elements La and Ce; A' is one or more selected from the group consisting of lanthanide rare earth elements other than La, Ce, and Y; Q' is one or more selected from the group consisting of Fe, Co, and Ni; M' is one or more selected from the group consisting of Al, Cr, Cu, Zn, Ga, Ge, Mn, Mo, Nb, P, Pb, Si, Ta, Ti, V, Zr, O, F, N, C, S, and H; B is boron; a, b, c, and d satisfy the following relationships: $0<a\leq 0.8$, $23\leq b\leq 33$, $0.5\leq c\leq 8$, and $0.9\leq d\leq 1.4$; and Y is excluded from the composition;

(2) loading a grain boundary diffusion alloy source on a surface of the initial magnet, wherein the grain boundary diffusion alloy source has a composition of $R''_uM''_{1-u}$, wherein R'' is one or two selected from the group consisting of light rare earth elements Nd and Pr; M'' is one or more selected from the group consisting of Fe, Co, Ni, Al, Cr, Cu, Zn, Ga, Ge, Mn, Mo, Si, and Ti; and u satisfies the following relationship: $0<u<1$;

(3) placing the initial magnet loaded with the grain boundary diffusion alloy source in a spark plasma sintering (SPS) device, and heating the initial magnet loaded with the grain boundary diffusion alloy source at a heating rate of 20° C./min to 400° C./min in the SPS device to allow a grain boundary diffusion for 40 min to 180 min at a diffusion temperature of 400° C. to 900° C., a pressure of 2 MPa to 50 MPa, and a vacuum degree of less than $10^{-3}$ Pa to obtain a final magnet.

2. The grain boundary diffusion method according to claim 1, wherein in step (2), loading the grain boundary diffusion alloy source is achieved by an electrodeposition, a chemical vapor deposition (CVD), a physical vapor deposition (PVD), a direct physical contact, or an adhesive bonding.

3. The grain boundary diffusion method according to claim 1, wherein in step (1) a satisfies the following relationship: $0.4\leq a\leq 0.8$.

4. The grain boundary diffusion method according to claim 3, wherein in step (1) a height of the initial magnet is between 18 mm and 60 mm, and a coercivity ($H_{cj}$) is between 12.5 kOe and 25.4 kOe.

* * * * *